United States Patent [19]
du Gay

[11] Patent Number: 5,172,917
[45] Date of Patent: Dec. 22, 1992

[54] SEALING DEVICE FOR SEALING AN ANNULAR SPACE BETWEEN TWO MACHINE ELEMENTS WHICH ARE ROTATABLE IN RELATION TO EACH OTHER

[75] Inventor: Frank du Gay, Basel, Switzerland

[73] Assignee: Forsheda AB, Forsheda, Sweden

[21] Appl. No.: 692,727

[22] Filed: Apr. 29, 1991

[30] Foreign Application Priority Data

Apr. 27, 1990 [SE] Sweden ................. 9001564

[51] Int. Cl.⁵ .................. F16J 15/32; F16J 15/34
[52] U.S. Cl. ....................... 277/95; 277/38; 277/152; 277/207 R; 277/208; 277/2
[58] Field of Search ........... 277/2, 37, 38, 39, 95, 277/152, 65, 206 R, 208; 384/143, 482

[56] References Cited

U.S. PATENT DOCUMENTS

| | | | |
|---|---|---|---|
| 2,132,249 | 10/1938 | Van Pelt | 277/95 X |
| 2,547,185 | 4/1951 | Bothar | 277/95 |
| 3,246,369 | 4/1966 | Rhoads et al. | 277/153 |
| 3,703,296 | 11/1972 | Malmstrom | 277/95 X |
| 3,748,002 | 7/1973 | Barker et al. | 384/482 X |
| 4,283,063 | 8/1981 | Prescott | 277/37 |
| 4,311,315 | 1/1982 | Kronenberg | 277/95 |
| 4,437,673 | 3/1984 | Miyamoto | 277/39 X |
| 4,448,426 | 5/1984 | Jackowski et al. | 277/37 |
| 4,521,027 | 6/1985 | Marshall | 277/152 |
| 4,723,350 | 2/1988 | Kobayashi et al. | 277/152 X |
| 4,817,846 | 4/1989 | Eichinger | 277/65 X |
| 5,004,248 | 4/1991 | Messenger et al. | 277/37 |

FOREIGN PATENT DOCUMENTS

| | | | |
|---|---|---|---|
| 265452 | 3/1989 | German Democratic Rep. | 277/152 |
| 1370268 | 10/1974 | United Kingdom | 277/95 |

OTHER PUBLICATIONS

C. R. Seals Handbook (catalog #457010), p. 25, Jan. 1986.

Primary Examiner—William A. Cuchlinski, Jr.
Assistant Examiner—Scott W. Cummings
Attorney, Agent, or Firm—Pollock, Vande Sande & Priddy

[57] ABSTRACT

A sealing device for sealing an annular space between two machine elements (2, 4) rotatable in relation to each other, comprising an elastic material sealing ring (8) and a counterface (36) engaged by a sealing lip (14) of the sealing ring. The sealing ring (8) has a main body (12) received in a groove (22) in one of the machine elements (2). The main body (12) of the sealing ring has, at least one of two side surfaces of the groove (22), at least one annular projection (18) engaging the opposite side surface of the groove.

8 Claims, 1 Drawing Sheet 5,172,917

SEALING DEVICE FOR SEALING AN ANNULAR SPACE BETWEEN TWO MACHINE ELEMENTS WHICH ARE ROTATABLE IN RELATION TO EACH OTHER

FIELD OF THE INVENTION

The present invention relates to a sealing device for sealing an annular space between two machine elements which are rotatable in relation to each other.

BACKGROUND OF THE INVENTION

A previously known sealing device of this kind comprises an elastic material sealing ring consisting of a main body sealingly and unrotatably connected with one of the machine elements and a sealing lip unitary with the main body and contacting a counterface non-rotatably supported by the other machine element, the sealing lip sliding against said counterface when the machine elements are rotated in relation to each other.

In a common type of sealing device of the above kind, the sealing ring consists of a substantially cylindrical, tubular main body to which the sealing lip is connected at the inner periphery of one of the side surfaces of the main body, forming a V-shaped groove between the main body and the sealing lip.

In a previously known sealing device of this kind, it is known to mount the sealing ring on a cylindrical surface, for example a shaft, and to lock the sealing ring in relation to said counterface by means of the elastic main body. Prior to the mounting of the sealing ring on the cylindrical surface, the main body has an inner diameter which is substantially smaller than the outer diameter of the cylindrical surface, so that the main body of the sealing ring will be in a tensioned condition on the cylindrical surface when the ring has been mounted thereon. The lip of the sealing ring has a predetermined axial compression in relation to the counterface providing a relatively small lip pressure against the counterface.

When using sealing devices of the aforementioned kind in the region of the bearing arrangement for two machine elements which are rotatable in relation to each other, for example in a washing machine, the sealing device has the object of preventing introduction of, for example, a solution of water, detergent and textile fibers to the bearing due to the grip of the main body of the sealing ring on the cylindrical surface on which the sealing ring is mounted, the sliding and frictional contact between the lip and the counterface, and the static seal between the counteface and the housing in which the bearing is arranged. Partly due to the introduction of fluid detergents which may have a swelling effect on the elastic material of the sealing ring, and partly due to oxidation of the surface (e.g., of aluminum) on which the sealing ring is mounted, it has become common practice to arrange the main body of the sealing ring in an annular groove in the first machine element. By taking this precaution, the problems caused by swelling and oxidation have been eliminated. However, the positioning of the main body of the sealing ring in a groove leads to some manufacturing problems due to more stringent tolerance requirements and mounting problems because of the air entrapped in the annular groove when the sealing ring is being mounted therein.

SUMMARY OF THE INVENTION

An object of the present invention is to obviate the above problem in sealing devices of the kind in question in which the main body of the sealing ring is positioned in a groove.

To this end, in the sealing device according to the invention the main body of the sealing ring has on at least one of two side surfaces of the groove an annular projection engaging the opposite side surface of the groove.

The projection can be formed by an elastically flexible sealing lip.

When the sealing ring is being mounted in the annular groove, air which is trapped behind the main body of the sealing ring can pass the radial projections so that the inner surface of the main body of the sealing ring can reach a position in which it contacts the bottom surface of the annular groove. This positions the sealing ring correctly in relation to the machine element supporting the sealing ring and in relation to the counterface.

The provision of said projections on the main body of the sealing ring relaxes the tolerance requirements with regard to the annular groove as well as with regard to the main body of the sealing ring to practically feasible and economic levels.

There is another problem when using sealing devices of the kind mentioned above in machines in which there is a high rotational speed between the machine elements, which is the case, for example, in washing machines during the spin or centrifugation cycle. This problem is represented by the fact that, because of the friction of the sealing lip at high rotational speeds, the temperature of the counterface is raised to high values, causing damages to or destruction of the sealing lip.

Another object of the invention is to obviate the last-mentioned problem. To this end, the sealing ring according to the invention comprises an element which is non-rotatably supported by the second machine element and comprises a part consisting of rigid material, preferably metal, and forming said counterface, and an elastic material part connected with a part constituting the counterface and the other machine element and positioned between said part and said machine element, the elastic material consisting of a graphitic nitrile rubber preferably containing at least 20% graphite by weight.

By the inclusion of graphite in the elastic material, the heat transfer properties of the element forming the counterface are enhanced so that the frictional heat created by the sliding of the lip against the counterface is drawn off in a more efficient manner.

BRIEF DESCRIPTION OF THE DRAWINGS

Such embodiments of the invention will now be described with reference to the accompanying drawings.

FIGS. 2b and 2c are axial sections of further embodiments of sealing rings corresponding to the sealing ring of FIG. 2a.

DESCRIPTION OF PREFERRED EMBODIMENT

Figure 1:
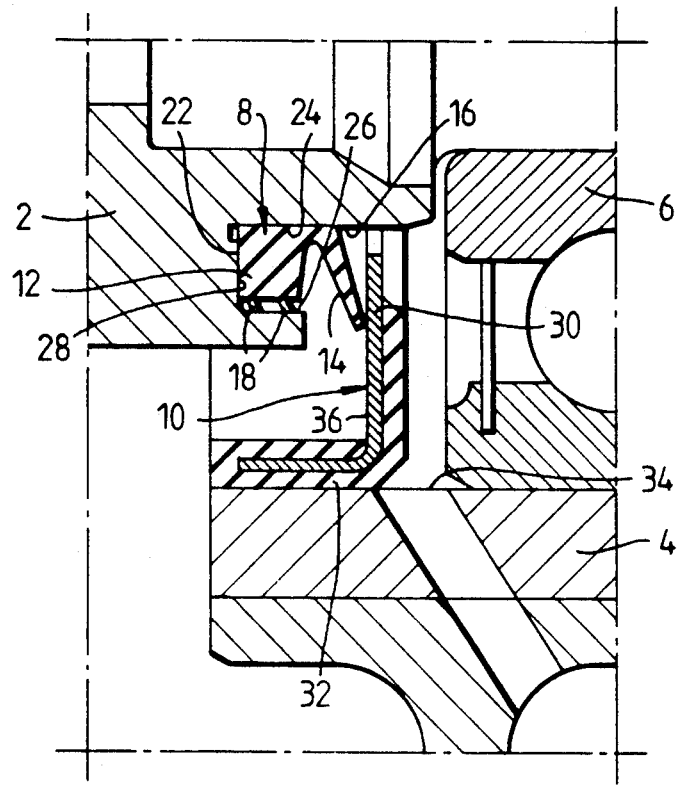
FIG. 1 is an axial section of one half of a sealing device according to the invention, assembled in a washing machine.

FIG. 1 shows a machine element constituted by a shaft 2 rotatably supported in a washing machine by means of a second machine element constituted by a stationary part 4. The shaft 2 is rotatably supported by the stationary part 2 by means of a bearing 6.

The bearing 6 is protected from water, detergents, textile fibers and dirt in the washing machine by means of a sealing device according to the invention. The sealing device is positioned in the annular space between the shaft 2 and the stationary portion 4. The sealing device consists of a sealing ring 8 and an annular element 10 having in axial section an angular profile.

The sealing ring 8 consists of elastic material, preferably rubber, and comprises a main body 12 and a sealing lip 14 unitary therewith. The sealing ring 8 is in a tensioned state positioned on a cylindrical surface 16 of the shaft, and before the sealing ring 8 is positioned on the cylindrical surface 16 the sealing ring has an inner diameter which is less than the outer diameter of the cylindrical surface, 16. At its radially outer surface the main body 12 of the sealing ring 8 has two annular sealing lips 18 extending radially outwards. Between the sealing lips 18, the main body is provided with an identification text which provides information about the dimensions of the sealing ring.

The cylindrical surface 16 of the shaft 2 on which the sealing ring 8 is supported in a tensioned state forms at the left-hand portion of FIG. 1, a surface of an annular groove 22 which is thus constituted by two concentric side surfaces 24 and 26 and a bottom surface 28 extending therebetween. The main body 12 of the sealing ring 8 is received in the annular groove 22 with the radially inner bottom surface of the main body 12 contacting the side surface 24, the sealing lips 18 contacting the side surface 26 and the surface of the main body 12 opposite the sealing lip 14 of the sealing ring 8 contacting the bottom surface 28 of the groove. The distance between the side surfaces 24 and 26 is such, in relation to the radial size of the main body 12 of the sealing ring 8, that the sealing lips 18 are resiliently deflected when the main body 12 of the sealing ring 8 is introduced in the groove 22.

The sealing lips 18 facilitate the introduction of the main body 12 into the groove 22 because the air trapped in the groove inside the main body of the sealing ring can leave the groove by purging out past the sealing lips 18 before the main body of the sealing ring reaches the bottom surface 28. Because of the sealing lips 18, also, the tolerance requirements in respect of the distance between the side surfaces 24 and 26 of the groove and the dimensions of the main body 12 of the sealing ring are substantially less than if the sealing lips 18 were not present so that the outer peripheral surface of the main body 12 would have to contact the side surface 26 directly.

The annular element 10 consists of a ring 30 of metal or another rigid material, the ring having an angular profile. An elastic material element 32 partly encloses the ring. The annular element 10 is fastened to a cylindrical surface 34 of the stationary portion 4 and is positioned in relation to the sealing ring 8 so that an exposed surface of the ring 30 forms a counterface 36 engaged by the sealing lip 14 of the sealing ring 8. Thus, the sealing ring 8 and the annular element 10 cooperate so as to seal the annular space between the shaft 2 and the stationary element 4 so that the bearing 6 is protected against water, detergents, fibers and dirt in the washing machine.

Preferably the ring 30 is made of stainless steel and the ring 30 and the elastic element 32 are chemically bonded to each other.

When the shaft 2 is rotated, the sealing lip 14 of the sealing ring slides against the counterface 36 of the ring 30 producing a substantial amount of frictional heat at high rotational speeds, for example during the spinning or centrifugation cycle of the washing machine. If this heat is not carried off in an efficient manner the temperature of the ring 30 and the sealing lip 14 is raised to a value which leads to damage or even destruction of the sealing lip 14 so that the sealing effect deteriorates or even ceases.

In accordance with one embodiment of the invention the elastic element 32 is manufactured from graphitic nitrile rubber containing at least 20% graphite by weight. This provides the annular element 10 with a good capacity to lead off the frictional heat to the stationary portion 4 in which the annular element 10 is fastened, so that the rise of temperature of the ring 30 is kept at acceptable values also at high rotational speeds of the shaft 2.

The generation of frictional heat can be reduced by manufacturing at least the portion of the sealing lip 4 engaging the counterface 36 from chlorinated rubber.

With regard to the forming of the sealing lip 14 of the sealing ring 8, it is advantageous to cut out the sealing lip so as to obtain optimal sealing efficiency between the sealing lip and the counterface 36. Such cutting reduces the risk of effects which can be found in sealing rings in which the lip is manufactured by molding. Preferably, the angle between the front surface of the sealing lip and the surface defining the periphery of the lip is about 90°.

Figure 2A:
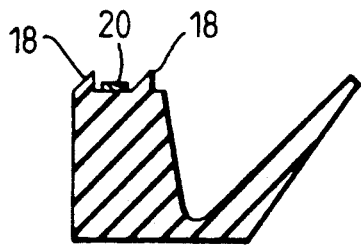
FIG. 2a is an axial section of a profile of a sealing ring included in the sealing device according to FIG. 1.
Figure 2C:
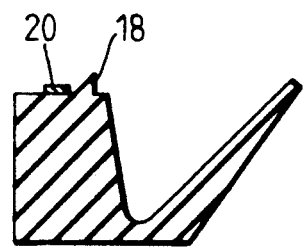
Figure 2B:
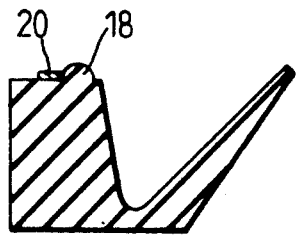

FIGS. 2a, 2b and 2c show different embodiments of the sealing ring of the sealing device according to the invention. In the embodiment according to FIG. 2a, the outer peripheral surface of the main body of the sealing ring has two annular projections in the form of sealing lips of triangular cross-sectional shape. An identification text 20 is provided between the sealing lips.

According to FIG. 2b, the sealing ring has, at the surface of the main body in question, only one sealing lip having the same cross-sectional shape as the sealing lips of the sealing ring according to FIG. 2a. The identification text is provided at one side of the sealing lip.

FIG. 2c shows an embodiment of the sealing ring in which said surface of the main body has only one annular projection having the form of a compression seal instead of a lip seal. The identification text is again positioned at one side of the projection.

I claim:

1. A sealing device for sealing an annular space between first and second machine elements which are rotatable relative to each other, said sealing device comprising an elastic material sealing ring comprising a main body which is at least partially received in a groove provided in said first machine element said groove formed by two concentric, axially extending side surfaces and a bottom surface extending radially between said side surfaces said sealing ring further comprising a sealing lip unitary with said main body and contacting a counterface which is non-rotatably supported by said second machine element and said sealing lip sliding against the counterface when the machine elements are rotated relative to each other, wherein said main body of the sealing ring received in the groove as a whole consists of elastic material and is compressed between and engages said two concentric side surfaces of said groove, said main body of said sealing ring contacting at least one of said two side surfaces of said groove and at least one annular projection contacting the opposite side surface of the groove, said projection being adapted to allow departure of air from said groove when said main body of said sealing ring is introduced into said groove and to seal said groove to prevent penetration of undesired matter to surfaces of said groove.

2. A sealing device according to claim 1, wherein said projection (18) is constituted by an elastically flexible sealing lip.

3. A sealing device as claimed in claim 1, wherein said projection (18) is constituted by an elastically compressible projection.

4. A sealing device according to claim 1, wherein said groove (22) is open in an axial direction, said sealing ring (8) under tension is positioned on a cylindrical surface (16) forming a radially outer side surface (24) of said groove, said projection (18) is positioned at and engages a radially inner side surface (26) of said groove, and said sealing lip (14) extends in an axial direction to engage said counterface (36) which extends in a radial direction.

5. A sealing device according to claim 1, further comprising an element non-rotatably supported by said second machine element (4) and consisting of a portion (30) of rigid material forming said counterface and an elastic material portion (32) connected to said rigid material portion and to said first machine element (2).

6. A sealing device according to claim 5, wherein said elastic material (32) is graphitic nitrile rubber.

7. A sealing device as claimed in claim 6, wherein said graphitic nitrile rubber contains at least 20% graphite by weight.

8. A sealing device as claimed in claim 5, wherein said portion (30) consisting of rigid material and forming said counterface is chemically bonded to said elastic material portion (32).

* * * * *